(12) United States Patent
Stehr et al.

(10) Patent No.: US 7,757,831 B2
(45) Date of Patent: Jul. 20, 2010

(54) METHOD AND APPARATUS FOR CONTROLLING A MOTOR VEHICLE CLUTCH

(75) Inventors: Reinhard Stehr, Bühl (DE); Manfred Homm, Bühl-Neusatz (DE); Marco Grethel, Bühlertal (DE)

(73) Assignee: LuK Lammellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 12/006,240

(22) Filed: Dec. 31, 2007

(65) Prior Publication Data
US 2008/0190729 A1 Aug. 14, 2008

Related U.S. Application Data

(63) Continuation of application No. PCT/DE2006/000977, filed on Jun. 7, 2006.

(30) Foreign Application Priority Data

Jul. 1, 2005 (DE) .................. 10 2005 030 730

(51) Int. Cl.
*F16D 48/06* (2006.01)
*F16D 48/02* (2006.01)

(52) U.S. Cl. .................. 192/85.63; 192/109 F
(58) Field of Classification Search ............. 192/85.63
See application file for complete search history.

(56) References Cited

U.S. PATENT DOCUMENTS

| 3,321,055 | A * | 5/1967 | Randol .................. 192/13 R |
| 4,560,047 | A | 12/1985 | McCarthy et al. .......... 192/52.4 |
| 4,718,516 | A | 1/1988 | Ozaki et al. ................. 180/233 |
| 6,530,463 | B1 * | 3/2003 | Beck ...................... 192/87.18 |
| 6,997,299 | B2 * | 2/2006 | Brissenden et al. ....... 192/85 R |
| 2003/0047410 | A1 | 3/2003 | Busold et al. ............ 192/87.11 |
| 2004/0159523 | A1 | 8/2004 | Duan et al. .................. 192/85 |

FOREIGN PATENT DOCUMENTS

JP    63-110029 A  *  5/1988

* cited by examiner

*Primary Examiner*—Rodney H Bonck
(74) *Attorney, Agent, or Firm*—Alfred J. Mangels

(57) ABSTRACT

A method, and apparatus in the form of a hydraulic unit, for triggering at least one clutch in a hydraulic circuit for an axle transmission of a vehicle. The method and apparatus make it possible to simply and very quickly make available an adequate amount of working fluid at the required pressure to at least one clutch, according to the driving situation, in order to close the clutch.

21 Claims, 6 Drawing Sheets

METHOD AND APPARATUS FOR CONTROLLING A MOTOR VEHICLE CLUTCH

CROSS-REFERENCE TO RELATED APPLICATION

This is a continuation of International Application Serial No. PCT/DE2006/000977, with an international filing date of 7 Jun. 2006, and designating the United States, the entire contents of which is hereby incorporated by reference to the same extent as if fully rewritten.

BACKGROUND OF THE INVENTION

1. Field of the Invention

The present invention relates to a method and apparatus in the form of a hydraulic unit for actuating a vehicle clutch.

2. Description of the Related Art

Solutions known heretofore for actuating a clutch in an axle drive of a vehicle, in order to compensate for a steering error in certain driving situations, provide for a hydraulic unit that includes a high-pressure storage device, which must be filled up to the maximum clutch pressure in order to be able to engage the clutch or clutches with rapid response in those certain driving conditions. However, a low pressure in the pressure storage device would be adequate for pre-filling a clutch.

Figure 1:
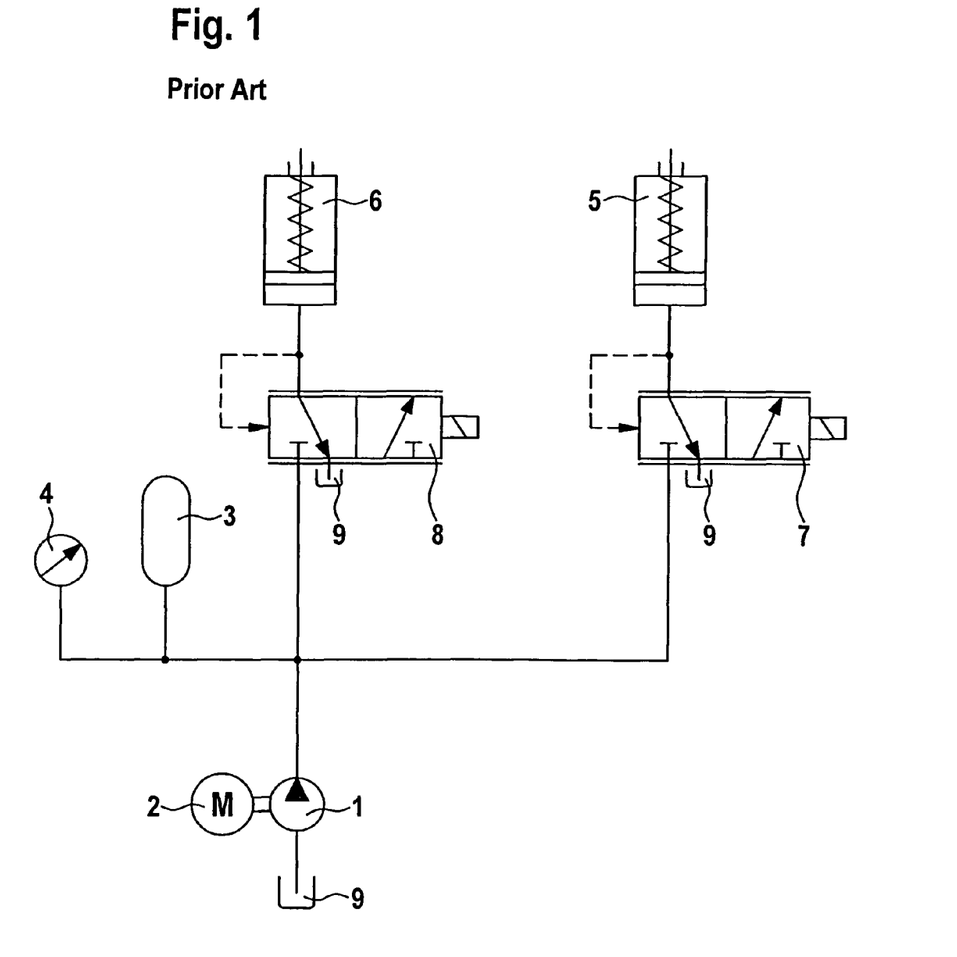
FIG. 1: a schematic depiction of a hydraulic unit having a high pressure storage device according to the existing art.

FIG. 1 shows a schematic depiction of such a hydraulic unit, as it is used in the existing art.

A pump 1 is driven by an electric motor 2 and fills the high pressure storage device 3, which is designed as a diaphragm-type accumulator. A sensor 4 measures the pressure. If two clutches 5 and 6 are provided, they are each actuated via a solenoid valve 7 and 8, respectively, and if necessary are supplied with the working fluid from the high pressure storage device 3. The pump 1 is supplied with the working fluid from a tank 9.

The solenoid valves 7 and 8 are designed, for example, as pressure-reducing valves. To pre-fill the clutches 5 or 6 it would be adequate to transport the working fluid at a low pressure of, for example, 5 to 10 bar, in order to fill the lift free-play of the clutches. To engage the clutch 5 or 6 a pressure of about 45 bar would have to be present, without need of a flow volume of working fluid.

However, the known hydraulic unit uses a large and expensive high-pressure storage device to fill and to engage the clutches 5 or 6.

If the clutches 5 and 6 are disengaged, the working fluid flows through the solenoid valves 7 and 8 back into the tank 9. The depicted elements of the known hydraulic unit are connected with each other via hydraulic lines or control lines, as shown in FIG. 1.

By switching the solenoid valves 7 and 8 accordingly, the clutches 5 and 6 are supplied with working fluid from the high pressure storage device 3, so that they are engaged, or the working fluid is transported from the clutches 5 and 6 back into the tank 9, whereupon the clutches 5 or 6 disengage by their own weight or a spring.

An object of the present invention is therefore to provide a device in the form of a hydraulic unit and a method for actuating this device, which enables the filling and engaging of the at least one clutch with simple construction and while maintaining high dynamics (rapid response), while the intent is to dispense with the use of a high-pressure storage device.

Preferably, in this case two multi-plate clutches provided in a rear axle of a vehicle, i.e., in a rear axle differential, should be engaged hydraulically to redistribute the wheel torques.

SUMMARY OF THE INVENTION

Accordingly, the hydraulic unit, which is provided in particular for actuating at least one clutch in a hydraulic circuit for an axle drive of a vehicle, includes a pump which transports a working fluid, a pressure storage device that stores the working fluid under pressure, and at least one solenoid valve which is situated in the infeed of the at least one clutch, the pressure storage device being designed as a low pressure reservoir and being operatively connected with the pump so that depending on the driving situation of the at least one clutch the corresponding requisite working fluid is available at the required pressure.

The advantage here is that the expense of a high pressure tank, as it is used in the existing arrangement, can be saved and replaced by a simple, robust, and inexpensive low pressure reservoir. Furthermore, in this embodiment according to the invention the pump can be very small.

The pump, which is preferably driven by an electric motor, loads the low pressure reservoir up to the pressure that is necessary to fill the clutch, for example 10 bar. However, the pump can be driven equally well by a drive shaft of an electric motor, or that of an internal combustion engine of the motor vehicle. To this end, a pressure limiting valve is preferably built into the hydraulic circuit which limits the pressure accordingly. After the low pressure reservoir is loaded, the pump can be switched off.

Preferably, a pressure reducing valve is installed ahead of each clutch that is to be operated, so that the pressure from the low pressure reservoir can be directed into the clutch and the latter filled as soon as current is applied to the pressure reducing valve. By preference, the pump is put into operation at the same time, so that directly after the filling of the clutch(es) the pump pressure operates the pressure reducing valve and the clutch engages accordingly.

In addition, a sequence valve must be provided between the pump and the low pressure reservoir, which always closes far enough so that the pump pressure operates the pressure reducing valve, whereupon the fluid flowing from the sequence valve, preferably an oil, is used to reload the low pressure reservoir.

In an advantageous design of the invention, the low pressure reservoir is executed as a spring-pressurized reservoir, where a mechanical spring is installed instead of the otherwise normal gas cavity, and thus an especially inexpensive and sturdy pressure storage device is realizable.

In another advantageous design of the solution according to the invention, either a pressure reducing valve is provided in the supply line for each clutch, or one pressure reducing valve and one selector valve are provided for two clutches.

It is also advantageous that the solenoid valve is a pressure reducing valve, which dams up the working fluid transported by the pump to the pressure level needed to engage the clutch.

Preferably each of the two clutches is provided with its own pump, so that the two clutches, executed for example as multi-plate clutches and situated in a rear axle differential of a vehicle, can be actuated or engaged independently of each other.

A preferred embodiment of the invention provides for the power steering pump of the vehicle to be used as the pump. The existing power steering pump thus serves as the source for the pressurized working fluid. To this end, the outflow pressure of the power steering system is used to fill and engage the clutch(es). In this embodiment, suitable measures must be taken to ensure that the steering function receives higher priority than the clutch function.

Alternatively, the pump or pumps (if a separate pump is provided for each clutch) can be operated constantly, so that there is no longer a need to provide a pressure storage device in the hydraulic unit.

An advantage of the solution according to the invention is that the expensive high pressure storage device used in the existing art can be spared.

The hydraulic unit according to the invention, which is designed in particular to actuate at least one clutch in an axle drive of a vehicle, can have at least one pump which transports a working fluid and at least one solenoid valve which is assigned to the at least one clutch, with the pump transporting the working fluid to the clutch under pressure both to fill the clutch and to engage the clutch.

The working fluid can be transported constantly by the pump, and can therefore be used not only for the clutch engaging function, but under certain circumstances also for a cooling function, for example to cool a rear axle differential.

With the present invention, the technical complexity of actuating preferably two hydraulically engageable multi-plate clutches that are to be engaged hydraulically in certain driving situations in a rear axle differential is to be kept to a minimum. A high degree of dynamics is necessary here; an air gap in the clutch must be closed by filling it with the working fluid before the clutch is actually engaged. At least one of the two clutches must be engaged in an extremely short time (under 100 ms). A relatively low pressure of 5 to 10 bar is necessary for filling, whereas a pressure of about 45 bar must be applied for the final engaging of the clutch, although of course practically no flow volume of working fluid is still needed.

BRIEF DESCRIPTION OF THE DRAWINGS

Additional advantages and advantageous embodiments are the objects of the following descriptions of the figures.

The figures show the following details.

DESCRIPTION OF THE PREFERRED EMBODIMENTS

For all embodiments, the same reference labels are used for the same or like-operating components.

A first preferred embodiment according to the present invention will be described below, with reference to FIG. 2.

For two clutches 5 and 6, which are installed, for example, in an axle drive, a rear axle differential of a vehicle to distribute the wheel torque, two pumps 1 are provided which ensure that the clutches 5 and 6 are supplied with working fluid or oil. Each of the clutches 5 and 6 is supplied with oil by a separate pump 1, which are preferably driven by the axle shafts of the rear axle. Optionally, the two pumps 1 may also be driven by electric motors (not shown).

Figure 2:
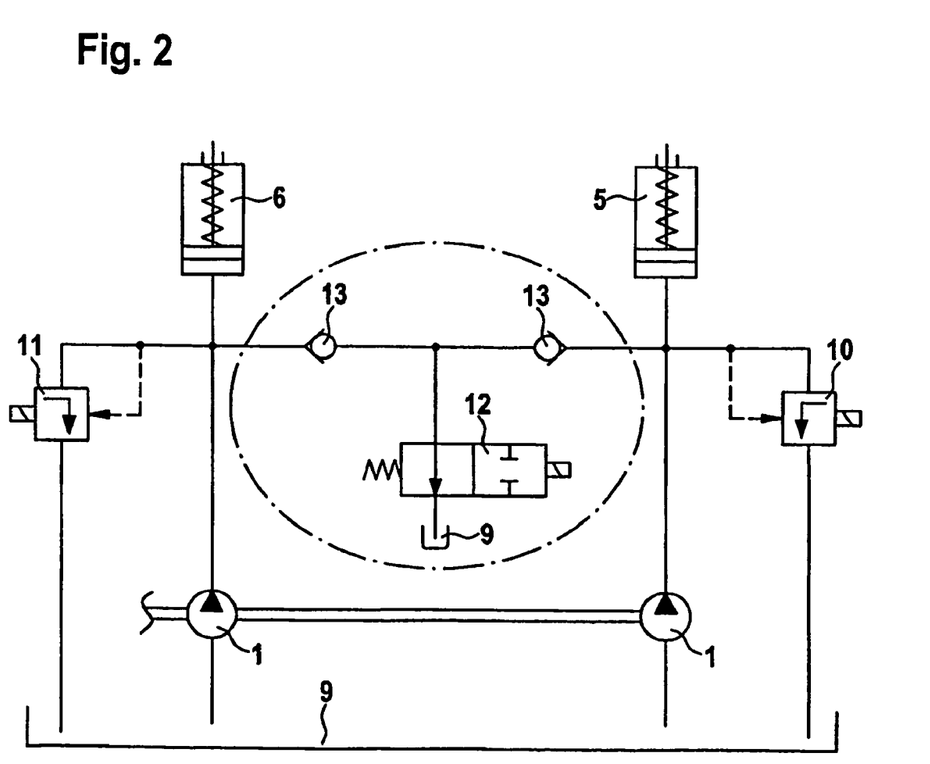
FIG. 2: a schematic depiction of a first preferred embodiment of a hydraulic unit according to the invention with two constantly operated pumps for two clutches.

The two clutches 5 and 6 according to FIG. 2 can be actuated, i.e., engaged, independently of each other, with no high pressure storage device necessary. Instead of two separate pumps 1, an embodiment with only one vane pump can also be realized, in which case each of the two flows from this vane pump then provides the supply of oil for one of the clutches 5 and 6.

In each hydraulic circle assigned to clutch 5 or 6, when electricity is applied an electrically operated pressure limiting valve 10 or 11, respectively, stores up the pump flow volume of working fluid or hydraulic oil to the necessary pressure level so that the particular clutch can be engaged, whereas when no power is applied to the pressure limiting valves 10 and 11 these valves open and divert the working fluid or hydraulic oil into the tank 9.

Optionally in an emergency, e.g. if one of the pressure limiting valves 10 or 11 fails, even a simple selector valve 12 can shut off the pressure for both clutches 5 and 6. This variant is depicted in the dashed circle in FIG. 2. The working fluid is then diverted from the clutches 5 and 6 through the check valves 13 and the selector valve 12 into the tank 9.

In the case of this described embodiment with a low pressure reservoir, the pump can be switched off if it is no longer necessary to fill the low pressure reservoir or if the clutch does not need to be engaged. The pump is then only operated when an engaging procedure of the clutch is actually initiated. The clutch will be (pre-)filled from the low pressure reservoir, while preferably the pump starts to run at the same time, in order to accomplish the final engagement of the clutch by means of the pump pressure.

Figure 3:
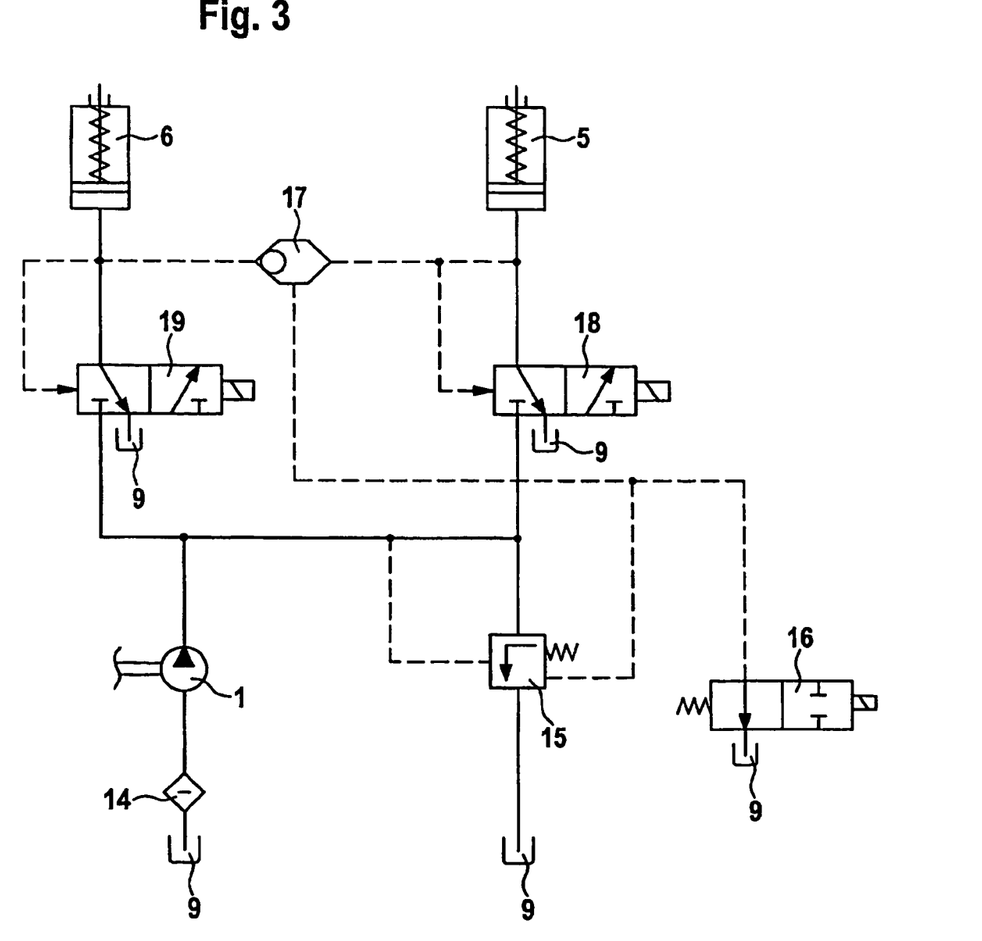
FIG. 3: a schematic depiction of a second preferred embodiment of a hydraulic unit according to the invention with one constantly operated pump for two clutches.

In the second embodiment according to the present invention, which is depicted in FIG. 3, only one pump 1 is provided, which supplies both clutches 5 and 6 with working fluid through pressure reducing valves 18 and 19 and a back-pressure valve 15.

In this case pump 1, which again is preferably driven by an axle shaft or an electric motor (not shown), using almost zero pressure in a rest position, conveys the working fluid through back-pressure valve 15 into tank 9, so that a constantly driven pump 1 can be employed.

According to a further preferred embodiment, not shown, the working fluid that is flowing out of the back-pressure valve 15 may be used for cooling, for example for cooling the rear axle differential.

When at least one of the two pressure reducing valves 18 or 19 is operated by the control signal of an electronic control unit, the clutch pressure of clutches 5 or 6 that arises, acting through the return with the OR element 17, increases the pressure of the working fluid at the back-pressure valve 15 corresponding to the needed clutch pressure. When the two pressure reducing valves 18 and 19 are operated simultaneously, if this is desired, the greater of the two clutch pressures governs and determines the system pressure.

When needed, an emergency bleed device 16 similar to that in FIG. 2 can be provided. The OR element 17 then assumes the function of the two check valves 13 provided in FIG. 2. The emergency bleed device 16 is designed in the present embodiment as a 2/2 directional selector valve, and can be implemented to be normally open or normally closed.

Figure 4:
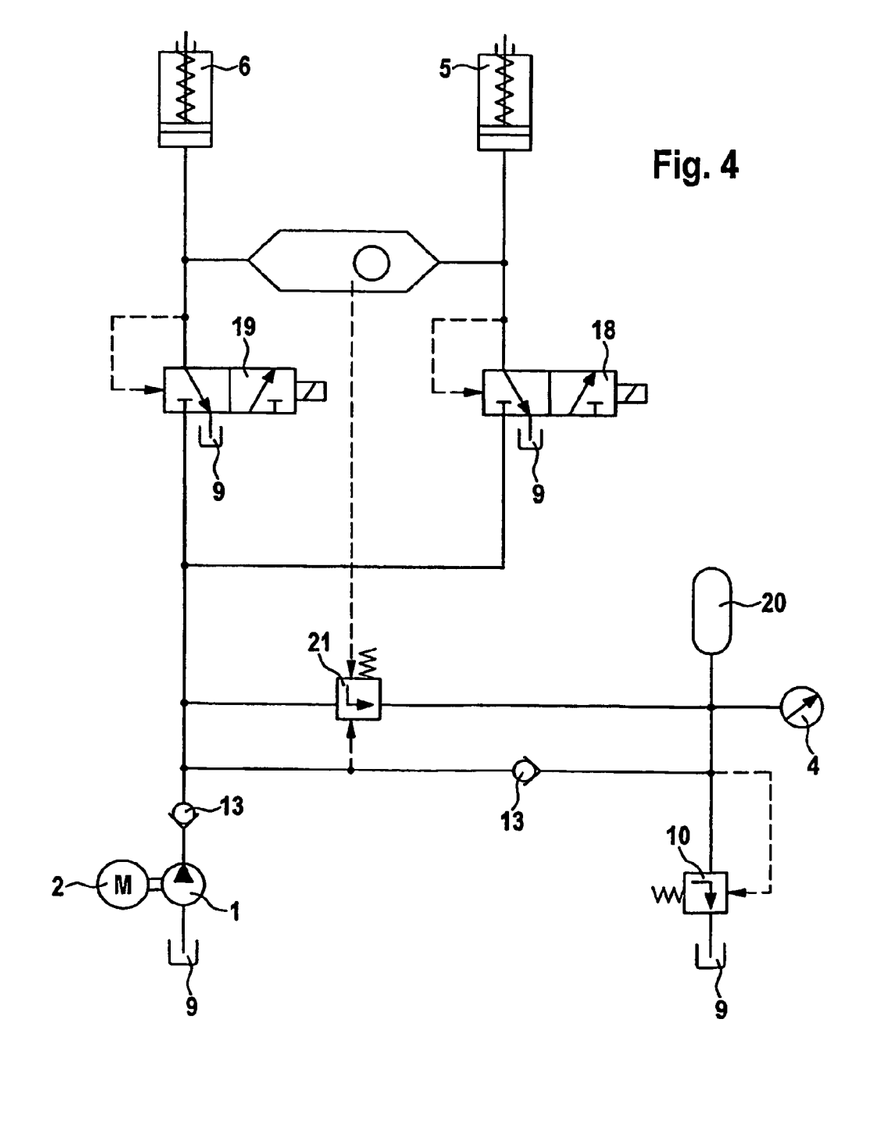
FIG. 4: a schematic depiction of a third preferred embodiment of a hydraulic unit according to the invention with a low pressure reservoir and a sequence valve.

An especially preferred third embodiment according to the present invention is depicted in FIG. 4.

A pump 1, which is driven by an electric motor 2, loads the pressure storage device in the form of a low pressure reservoir 20 up to a pressure that is needed to prefill clutches 5 and 6. In practice, this pressure is, for example, 10 bar. This pressure is limited by the permanently set pressure limiting valve 10 on the low pressure reservoir 20. If the low pressure reservoir 20 is filled or loaded, the pump 1 can be switched off under the control of a pressure sensor 4.

The storage pressure, i.e., the pressure of the low-pressure reservoir 20, is present at pressure reducing valves 18 and 19 through check valve 13, and can fill the respective clutch 5 or 6 immediately by the electronic control system when current is applied to one of the pressure reducing valves 18 or 19, even while the control unit is restarting the pump 1.

If the clutch pressure has risen above the storage pressure after the filling phase, in this embodiment the sequence valve 21 always closes far enough so that the pump pressure can operate the pressure reducing valves 18 and 19 and the working fluid flowing from the sequence valve 21 can be used by means of the pressure reducing valve 10 to reload the low pressure reservoir 20.

Since clutches 5 or 6 are filled from the low pressure reservoir 20, pump 1 can also be very small Likewise, since the pressure storage device is designed as a low pressure reservoir 20, the latter can be constructed simply, sturdily, and inexpensively. For example, a mechanical spring can be used as the storage element instead of the gas cavities normally employed in diaphragm-type accumulators. The storage device is thus temperature-independent, and suffers no pre-stress loss as a result of gas diffusion through a membrane.

If, as a result of the driving situation, the electronic control unit causes one of the clutches 5 or 6 to disengage, for example to compensate for a steering action, the pressure reducing valves 18 or 19 are switched accordingly and the working fluid can flow back into the tank 9.

In an embodiment that has not yet been depicted graphically, but which is valid for all of the embodiments described so far and is also applicable there, the actuation of two clutches 5 and 6 is achieved by means of only one pressure reducing valve 18 and one simple selector valve 12. That makes it possible to lower the costs by dispensing with another expensive pressure reducing valve. The system switches between the two clutches 5 and 6 with the help of selector valve 12, or in an emergency situation an appropriately designed selector valve 12 can also be used to switch over to the tank 9 in order to disengage either clutch 5 or 6. However, with this non-depicted embodiment the clutches 5 and 6 are operated one after the other, whereas in the embodiments described above the clutches 5 and 6 can work with overlap or can be actuated simultaneously.

Figure 5:
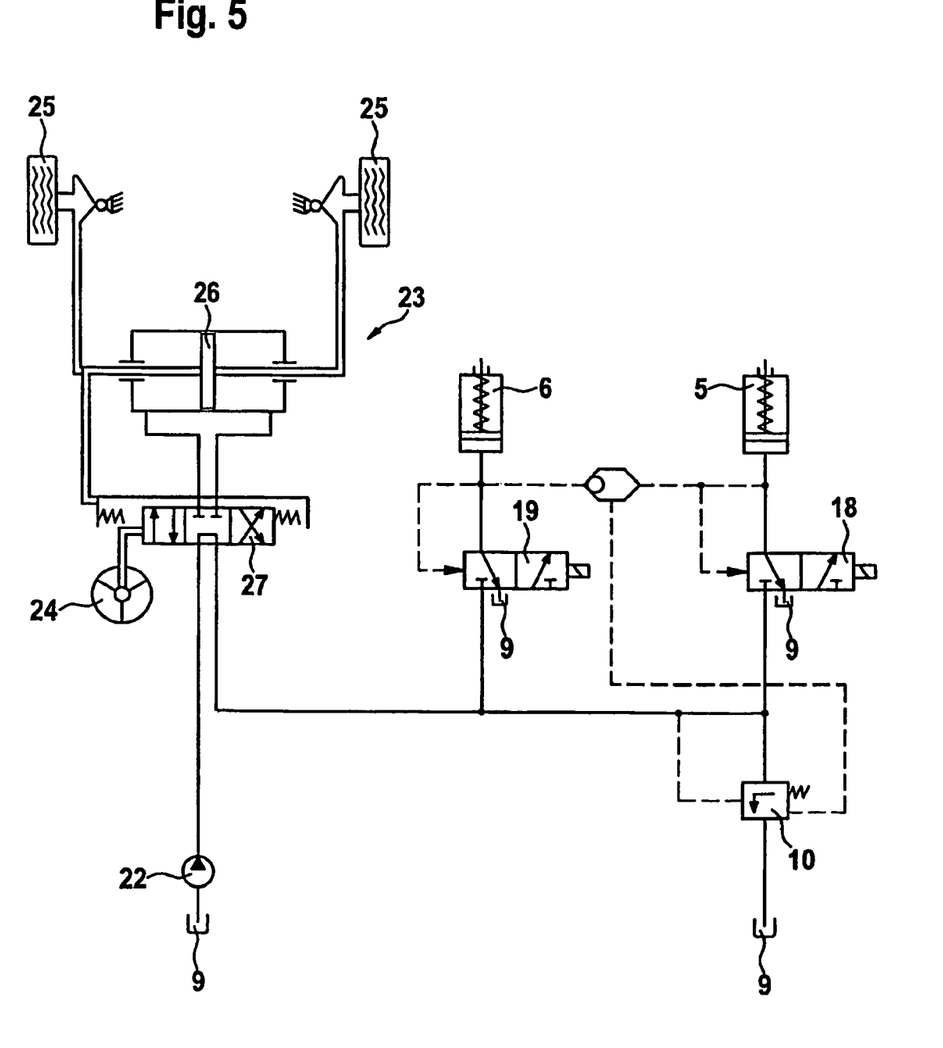
FIG. 5: a schematic depiction of a fourth preferred embodiment of a hydraulic unit according to the invention which is connected to the power steering system of a vehicle.

Finally, FIG. 5 depicts another preferred embodiment of the present invention, wherein in this fourth depicted embodiment an already present, constantly driven pump is used as the source of volume flow for the working fluid, for example the steering booster pump or power steering pump 22.

A power steering system 23 is designed as a circulation system, in which a constant (oil) flow of working fluid is throttled by a steering valve 27 and is applied to one of the two sides of a steering cylinder 26. Since this is a differential cylinder, the outflow pressure plays no role in the steering function, but rather only the built-up differential pressure.

The typical working pressures of the steering hydraulics are significantly greater than the pressures to actuate one of the two clutches 5 or 6, so that the tank build-up of the working fluid according to the solution in FIG. 5 has only a slight influence on the design of the power steering system 23.

The power steering pump 22 transports fluid from the tank 9. A driver of the vehicle inputs the steering impulses through a steering wheel 24, and the steering valve 27 actuates the steering cylinder 26 with working fluid correspondingly, so that the attached wheels 25 are steered accordingly.

Moreover, as a rule power steering pumps 22 with various pressure ratings are available—depending on the type of engine in the vehicle—so that for coupling with a clutch actuator of the rear axle, as proposed here, a transition to the next larger power steering pump 22 is possible.

If the outflow stream of the power steering system 23 is dammed up with a pressure limiting valve 10, as depicted in FIG. 3, as part of the prioritizing of the steering function the actuator of the clutch 5 and/or 6 can be targeted simultaneously with the power steering pump 22.

If the same working fluid or oil is employed in the power steering system 23 to lubricate and cool the clutches 5 and 6 as for the activation, the clutches 5 and 6 can in addition be cooled and lubricated with the drain oil.

In addition, the engine speed of the internal combustion engine of the vehicle would even define a certain capacity dependency of the cooling function.

Figure 6:
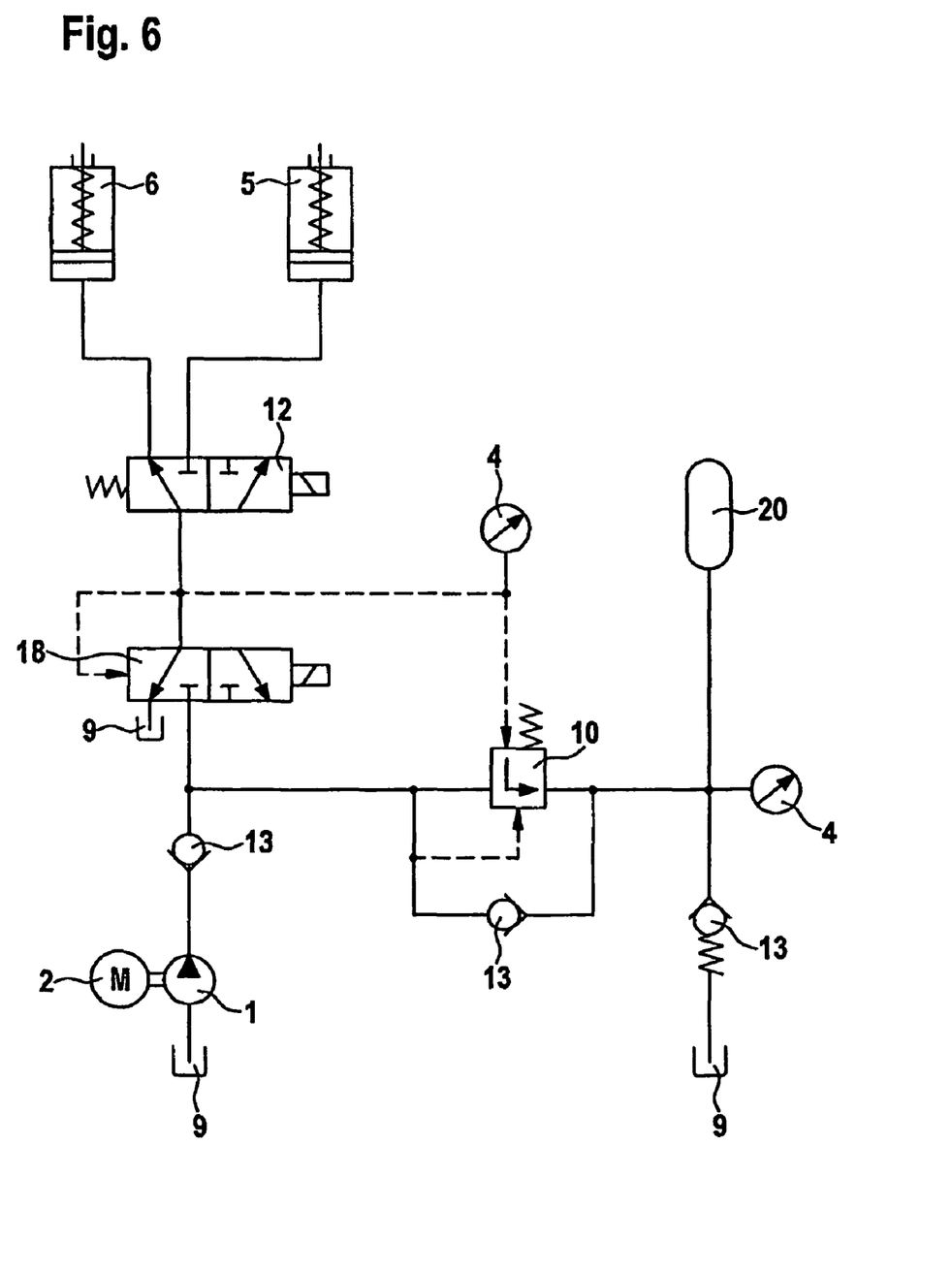
FIG. 6: an embodiment according to FIG. 4, in which only one pressure reducing valve is employed.

To save on costs, FIG. 6 depicts a fifth preferred embodiment of a solution according to the invention, which is based on the embodiment according to FIG. 4. In this hydraulic unit, again only one pressure reducing valve 18 is employed in combination with a simple selector valve 12 to actuate the two clutches 5 and 6, instead of two pressure reducing valves 18 and 19, while fulfilling the same function. The system switches between the two clutches 5 and 6 by means of the selector valve, or in an emergency situation an appropriately designed selector valve 12 can also be used to switch over to the tank 9 in order to disengage clutches 5 and 6.

The clearance spaces of clutches 5 and 6 are filled with working fluid from the low pressure reservoir 20, while pump 1 starts up and builds up the appropriate pressure through pressure reducing valve 18 for the final engagement of clutch 5 or 6.

If a signal is given via the electronic controller that clutch 5 or 6 is to be disengaged, as already mentioned in connection with FIG. 4, selector valve 12 is actuated and the working fluid flows back into tank 9 through pressure reducing valve 18.

Just as in accordance with FIG. 4, in this embodiment as well the dynamics for filling the clutch are retained and the clutch 5 or 6 engages in a time of under 100 ms, in order to be able to compensate for a steering mistake in the shortest time possible. However, an overlap of the engagement procedures of the two clutches 5 and 6 is not possible with this embodiment.

In FIG. 6, in contrast to FIG. 4, to reduce leakage there are not two pressure reducing valves 18 and 19 constantly under pressure. Hence in standby mode the leakage can be cut in half.

The pressure reducing valve employed in this situation is available in cartridge construction form, for example, so that the standby leakage can also be reduced by this construction form.

If the electric power should fail in an emergency situation, as described earlier, pressure reducing valve 18 will immediate depressurize the clutch pressure. If a pressure reducing valve 18 is jammed, pressure buildup is prevented by the fact that the electric motor 2 for the pump 1 does not start. Due to the leakage at the pressure reducing valve 18, the clutch pressure, if still present, is depressurized to the level of the low pressure reservoir 20.

The embodiments described above make it possible to actuate a plurality of clutches in a rear axle differential of a vehicle to redistribute the wheel torque without employing a large and expensive diaphragm-type accumulator as a high pressure storage device, in order to make available the high pressures of about 45 bar to actuate the clutch(es).

The invention claimed is:

1. A method for actuating at least one clutch of a vehicle in a hydraulic circuit having a pump, a hydraulic pressure storage device, and at least one solenoid valve situated in a hydraulic fluid infeed of the at least one clutch, said method comprising the steps of:
   providing as a hydraulic pressure storage device a low pressure hydraulic reservoir that is operatively connected with a clutch actuator of the at least one clutch and with the pump, wherein the low pressure hydraulic reservoir is pressurized to a pressure of up to about 10 bar;
   supplying pressurized hydraulic fluid from the low pressure hydraulic reservoir to fill the clutch actuator of the at least one clutch prior to clutch operation; and
   supplying to the clutch actuator pressurized hydraulic fluid from the pump at a pressure higher than the pressure of the low pressure reservoir for rapidly engaging the at least one clutch by providing the clutch actuator with needed pressurized hydraulic fluid at a requisite operating pressure to actuate the at least one clutch.

2. A method according to claim 1, including the following steps:
   a) filling the low pressure hydraulic reservoir by means of the pump;
   b) switching off the pump;
   c) filling the clutch actuator with working fluid from the low pressure hydraulic reservoir and starting up the pump;
   d) engaging the at least one clutch after filling the clutch actuator with pressurized hydraulic fluid with a working hydraulic pressure supplied by the pump;
   e) refilling the low pressure hydraulic reservoir after the at least one clutch is engaged;
   f) switching off the pump; and
   g) repeating steps c) through f) to engage the at least one clutch again during subsequent operating cycles of the at least one clutch.

3. A method according to claim 1, wherein the pump is in operation to fill the low pressure hydraulic reservoir and to engage the clutch.

4. A method according to claim 1, wherein the working fluid is stored in the low pressure hydraulic reservoir at a pressure of 5 to 10 bar.

5. A method according to claim 1, wherein the pump is placed in operation at the same time as the clutch actuator is being filled, in order to supply working fluid at high pressure to engage the clutch, and wherein the clutch actuator is initially filled with fluid from the low pressure reservoir.

6. A method according to claim 1, wherein the pump transports the working fluid constantly, independently of a driving situation of the vehicle.

7. Apparatus for carrying out the method according to claim 1 for actuating a clutch of a vehicle by a hydraulic circuit having a pump, a low pressure hydraulic reservoir, and a solenoid valve situated in an infeed of the clutch, wherein the low pressure hydraulic reservoir operates at a pressure of up to about 10 bar and is in operative connection with the pump in such a way that depending on the driving situation of the at least one clutch a volume of working fluid needed for filling the clutch actuator is available at the requisite pressure from the low pressure reservoir, including a pressure limiting valve for setting the pressure in the low pressure reservoir.

8. Apparatus according to claim 7, wherein the pump is provided to load the low pressure reservoir and is driven by one of an axle shaft of an electric motor or by an internal combustion engine of the vehicle.

9. Apparatus according to claim 7, wherein two clutches are actuated by respective clutch actuators, and a pressure reducing valve is provided in an infeed of a respective clutch actuator of each clutch.

10. Apparatus according to claim 9, wherein a pump is provided for each clutch.

11. Apparatus according to claim 9, wherein the clutches are multi-plate clutches and are situated in a rear axle differential of a vehicle.

12. Apparatus according to claim 7, wherein a sequence valve is provided between the pump and the pressure storage device for loading the low pressure reservoir.

13. Apparatus according to claim 7, wherein the low pressure reservoir is a spring-pressurized reservoir.

14. Apparatus according to claim 7, wherein two clutches are provided and are actuated by respective clutch actuators, and wherein one pressure reducing valve is provided in an infeed for a clutch actuator of each clutch, or one pressure reducing valve and one selector valve are provided in respective infeeds for each of the two clutches.

15. Apparatus according to claim 7, wherein the solenoid valve is a pressure reducing valve which backs up the working fluid transported by the pump to a pressure needed to engage the clutch.

16. Apparatus according to claim 7, wherein the pump is a power steering pump of the vehicle.

17. Apparatus according to claim 16, wherein a steering function of a power steering system of the vehicle has priority over actuation of the clutch.

18. Apparatus according to claim 7, wherein a pressure limiting valve is situated between the pump and the clutch, which builds up pressure of the working fluid to a requisite pressure level to engage the clutch.

19. A method according to claim 1, including the step of: supplying working fluid outlet pressure from a power steering system pump for filling the clutch actuator and for engaging the at least one clutch, wherein a working fluid outlet pressure of the pump is regulated by a pressure reducing valve before pressurized fluid from the pump is supplied to the clutch actuator.

20. A method according to claim 19, wherein the pump is constantly in operation.

21. A method according to claim 19, wherein outflow pressure of working fluid from the power steering system is built up by means of a pressure limiting valve before it is fed through a pressure reducing valve to the clutch actuator.

* * * * *